United States Patent
He et al.

(10) Patent No.: US 12,472,243 B2
(45) Date of Patent: Nov. 18, 2025

(54) COMBINED VACCINE AGAINST HUMAN RESPIRATORY SYNCYTIAL VIRUS (RSV) INFECTIONS AND METHOD THEREOF FOR INDUCING IMMUNE RESPONSE

(71) Applicants: BEIJING JIAOTONG UNIVERSITY, Beijing (CN); BEIJING ZHIFEI LVZHU BIOPHARMACEUTICAL CO., LTD., Beijing (CN)

(72) Inventors: Jinsheng He, Beijing (CN); Lin Du, Beijing (CN); Yuanhui Fu, Beijing (CN); Weihua Zhu, Beijing (CN); Xianglei Peng, Beijing (CN); Bo Gao, Beijing (CN); Yanpeng Zheng, Beijing (CN); Meiqin Liu, Beijing (CN)

(73) Assignees: BEIJING JIAOTONG UNIVERSITY, Beijing (CN); BEIJING ZHIFEI LVZHU BIOPHARMACEUTICAL CO., LTD., Beijing (CN)

( * ) Notice: Subject to any disclaimer, the term of this patent is extended or adjusted under 35 U.S.C. 154(b) by 352 days.

(21) Appl. No.: 17/768,074

(22) PCT Filed: Aug. 11, 2021

(86) PCT No.: PCT/CN2021/111960
§ 371 (c)(1),
(2) Date: Apr. 11, 2022

(87) PCT Pub. No.: WO2022/042300
PCT Pub. Date: Mar. 3, 2022

(65) Prior Publication Data
US 2024/0091334 A1    Mar. 21, 2024

(30) Foreign Application Priority Data
Aug. 25, 2020  (CN) .......................... 202010863764.9

(51) Int. Cl.
*A61K 39/12* (2006.01)
*A61P 31/14* (2006.01)
(Continued)

(52) U.S. Cl.
CPC .............. *A61K 39/12* (2013.01); *A61P 31/14* (2018.01); *A61P 37/04* (2018.01);
(Continued)

(58) Field of Classification Search
None
See application file for complete search history.

(56) References Cited

U.S. PATENT DOCUMENTS

| | | | | |
|---|---|---|---|---|
| 2014/0141042 A1* | 5/2014 | Vitelli | .................... | A61K 39/12 435/325 |
| 2020/0061181 A1* | 2/2020 | Godeaux | ................ | C12N 15/86 |

FOREIGN PATENT DOCUMENTS

| | | |
|---|---|---|
| CN | 101264323 A | 9/2008 |
| CN | 101675068 A | 3/2010 |

(Continued)

OTHER PUBLICATIONS

Barnes et al. (Science translational medicine. Jan. 4, 2012 ;4 (115): 115-ra1).*

(Continued)

*Primary Examiner* — Shanon A. Foley
(74) *Attorney, Agent, or Firm* — Thomas Horstemeyer, LLP

(57) ABSTRACT

The present disclosure provides a combined vaccine against human respiratory syncytial virus (RSV) infection and a method thereof for inducing immune response. The combined vaccine includes: a first composition including an immunologically effective dosage of a replication-deficient human adenovirus type 26 vector contains a nucleotide encoding an antigenic protein of RSV and a pharmaceuti- (Continued)

cally acceptable vector; and a second composition including an immunologically effective dosage of a replication-deficient chimpanzee adenovirus type 63 vector contains a nucleotide encoding an antigenic protein of RSV and a pharmaceutically acceptable vector. The first composition is a primary immunization composition and the second composition is a booster immunization composition; or vice versa. In the present disclosure, the combined vaccine is used for inducing a protective immunity against RSV infection, and a method is provided for generating the protective immunity against RSV infection.

10 Claims, 9 Drawing Sheets

Specification includes a Sequence Listing.

(51) Int. Cl.
    *A61P 37/04* (2006.01)
    *A61K 39/00* (2006.01)
(52) U.S. Cl.
    CPC .......... *A61K 2039/5254* (2013.01); *A61K 2039/5256* (2013.01); *A61K 2039/54* (2013.01); *A61K 2039/545* (2013.01); *A61K 2039/70* (2013.01)

(56) References Cited

FOREIGN PATENT DOCUMENTS

| | | | |
|---|---|---|---|
| CN | 102719478 A | 10/2012 | |
| CN | 103642761 A | 3/2014 | |
| CN | 103987726 A | 8/2014 | |
| CN | 104334188 A | 2/2015 | |
| CN | 104780937 A | 7/2015 | |
| CN | 105431169 A | 3/2016 | |
| CN | 109069612 A | 12/2018 | |
| CN | 111163800 A | 5/2020 | |
| CN | 112220921 A | 1/2021 | |
| WO | WO-2009079796 A1 * | 7/2009 | ............ A61K 39/12 |
| WO | 2014006191 A1 | 1/2014 | |
| WO | 2014174018 A1 | 10/2014 | |
| WO | 2019053109 A1 | 3/2019 | |

OTHER PUBLICATIONS

Capone et al. ( Expert review of vaccines. Apr. 1, 2013; 12 (4): 379-93).*
SEQ ID No. 1 alignment with Geneseq database access No. BHT48032 by Ha et al. Oct. 2018.*
Efficacy of adenovirus-vectored respiratory syncytial virus vaccines in a new ferret model, KH Hsu et al., Vaccine, May 1994;12(7):607-12.
Development of Vaccines Based on Adenoviral Vectors: A Review of Foreign Clinical Studies (Part 2), Cherenova L.V et al. Medical Immunology (Russia)/ 2017, vol. 19, 4, pp. 329-358.
Barnes E., Novel Adenovirus-Based Vaccines Induce Broad and Sustained T Cell Responses to HCV in Man, Science Translational Medicine, Jan. 4, 2012, vol. 4, p. 115.
Salisch N. C. et al: "Adenovectors encoding RSV-F protein induce durable and mucosal immunity in macaques after two intramuscular administrations", NPJ Vaccines, vol. 4, No. 1, Dec. 1, 2019 (Dec. 1, 2019), XP055960456, DOI: 10.1038/s41541-019-0150-4 Retrieved from the Internet: URL:http://www.nature.com/articles/s41541-019-0150-4.
Colloca Stefano et al: "Vaccine Vectors Derived from a Large Collection of Simian Adenoviruses Induce Potent Cellular Immunity Across Multiple Species", Science Translational Medicine,, vol. 4, No. 115, Jan. 1, 2012 (Jan. 1, 2012), pp. 47-55, XP009166675, ISSN: 1946-6234, DOI: 10.1126/SCITRANSLMED.3002925.

* cited by examiner

COMBINED VACCINE AGAINST HUMAN RESPIRATORY SYNCYTIAL VIRUS (RSV) INFECTIONS AND METHOD THEREOF FOR INDUCING IMMUNE RESPONSE

CROSS REFERENCE TO RELATED APPLICATION(S)

This application claims the benefit and priority of Chinese patent application No. 202010863764.9 filed before China National Intellectual Property Administration on Aug. 25, 2020 and entitled "COMBINED VACCINE AGAINST RESPIRATORY SYNCYTIAL VIRUS (RSV) INFECTIONS AND METHOD THEREOF FOR INDUCING IMMUNE RESPONSE", which is incorporated by reference herein in its entirety.

TECHNICAL FIELD

The present disclosure relates to the technical field of bioengineering, in particular to a combined vaccine against human respiratory syncytial virus (RSV) infection and a method thereof for inducing immune response.

BACKGROUND ART

Human respiratory syncytial virus (RSV) is widespread worldwide, and susceptible populations of it are mainly children, the elderly and immunocompromised patients. 70% of infants and young children may be infected with RSV before the age of 1, and almost all infants and young children may be infected with RSV before the age of 2. RSV is the most important pathogen causing pneumonia for children under 5 years old, and is an important pathogen leading to hospitalization and death for the elderly and the immunocompromised patients. About 33.1 million children worldwide are infected with RSV every year, wherein 99% of the children who died are from developing countries. It can be seen that RSV brings a heavy economic and social burden to countries around the world, especially developing countries. However, there is no currently-available commercial RSV vaccine for children.

Adenovirus vectors are widely used as vaccine vectors due to their high replication titer, desirable safety and high-efficiency expression of transgene. Similar to live attenuated vaccines, adenovirus vector vaccines can induce mucosal and cellular immunity; meanwhile, adenovirus vectors also have an adjuvant effect to induce a stronger immune response against transgene encoded protein in the body. However, humans are extensively infected with adenovirus type 5 (Ad5), and pre-existing immunity to the Ad5 can limit the efficacy of recombinant adenovirus type 5 (rAd5) vaccines. The levels of pre-existing antibody against human adenovirus type 26 (Ad26) and chimpanzee adenovirus type 63 (ChAd63), respectively, are lower than that of Ad5, avoiding the poor performance when Ad5 is exploited. Moreover, both recombinant Ad26 (rAd26) and recombinant ChAd63 (rChAd63) can be grown to high titers on cell lines suitable for production of clinical-grade vaccines.

When adenovirus vector vaccine is used to immunize it can induce the vaccinee to produce an immune response against the adenovirus vector itself, which will interfere with the efficacy of boosting immunization if the same vector is used twice. Therefore, a heterologous prime-boost immunization by using two kinds of different adenovirus vectors is beneficial to avoid an inhibiting effect of an induced adenovirus antibodies through primary immunization on a homologous booster.

SUMMARY

In view of this, to overcome the shortcomings of the prior art, an objective of the present disclosure is to provide a combined vaccine against RSV infections and a method thereof for inducing immune response.

To achieve the foregoing objective, the present disclosure adopts the following technical solution.

A combined vaccine against RSV infections, including: a first composition and a second composition; wherein
the first composition includes an immunologically effective dosage of a replication-deficient human adenovirus type 26 vector and a pharmaceutically acceptable vector, and the replication-deficient human adenovirus type 26 vector includes a nucleotide encoding an antigenic protein of RSV;
the second composition includes an immunologically effective dosage of a replication-deficient chimpanzee adenovirus type 63 vector and a pharmaceutically acceptable vector, and the replication-deficient chimpanzee adenovirus type 63 vector includes a nucleotide encoding an antigenic protein of RSV;
wherein the first composition is a primary immunization composition and the second composition is a booster immunization composition; alternatively, the first composition is the booster immunization composition, and the second composition is the primary immunization composition.

Preferably, in the first composition, the replication-deficient human adenovirus type 26 vector includes a nucleotide encoding a pre-fusion fusion glycoprotein preF and/or a nucleotide encoding an adhesion glycoprotein 130-230aa of RSV.

Preferably, in the second composition, the replication-deficient chimpanzee adenovirus type 63 vector includes a nucleotide encoding preF and/or a nucleotide encoding G 130-230.

Preferably, in the first composition, the replication-deficient human adenovirus type 26 vector includes a nucleotide encoding preF, the nucleotide sequence of which is set forth in SEQ ID NO: 1.

Preferably, in the first composition, the replication-deficient human adenovirus type 26 vector includes a nucleotide encoding G 130-230, the nucleotide sequence of which is set forth in SEQ ID NO: 2.

Preferably, in the first composition, the replication-deficient human adenovirus type 26 vector includes a nucleotide encoding both preF and G 130-230, the nucleotide sequence of which is set forth in SEQ ID NO: 3.

Preferably, in the second composition, the replication-deficient chimpanzee adenovirus type 63 vector includes nucleic acids encoding at least one of three antigenic proteins of RSV.

Preferably, in the second composition, the replication-deficient chimpanzee adenovirus type 63 vector includes a nucleic acid encoding at least one of three antigenic proteins of RSV, wherein the nucleic acid comprises the nucleotide sequences that are set forth in SEQ ID NO: 1, SEQ ID NO: 2 and SEQ ID NO: 3.

Preferably, in the first composition, the replication-deficient human adenovirus type 26 vector is rAd26; and in the second composition, the replication-deficient chimpanzee adenovirus type 63 vector is rChAd63.

Preferably, the combined vaccine is used to generate a protective immunity against RSV infections; wherein the first immunizer is used to elicit an immune response and the second composition is used to boost the immune response; alternatively, the second immunizer is used to elicit the immune response and the first composition is used to boost the immune response.

It can be seen from the technical solutions provided by examples of the present disclosure, the combined vaccine against RSV infection is used for inducing a protective immunity against RSV infections, and a composition, a vaccine and a method for providing the protective immunity against RSV infections.

Additional aspects and advantages of the present disclosure will be partially given in the following description, and become clear in the following description, or be learned through the practice of the present disclosure.

BRIEF DESCRIPTION OF DRAWINGS

To describe technical solutions of examples in present disclosure more clearly, briefly introductions of drawings to describe the examples is as following. Apparently, the drawings in the following description are only some examples of the present disclosure, and for those of ordinary skill in the art, other drawings can also be obtained from these drawings without creative efforts.

DETAILED DESCRIPTION OF THE EMBODIMENTS

Figure 1:
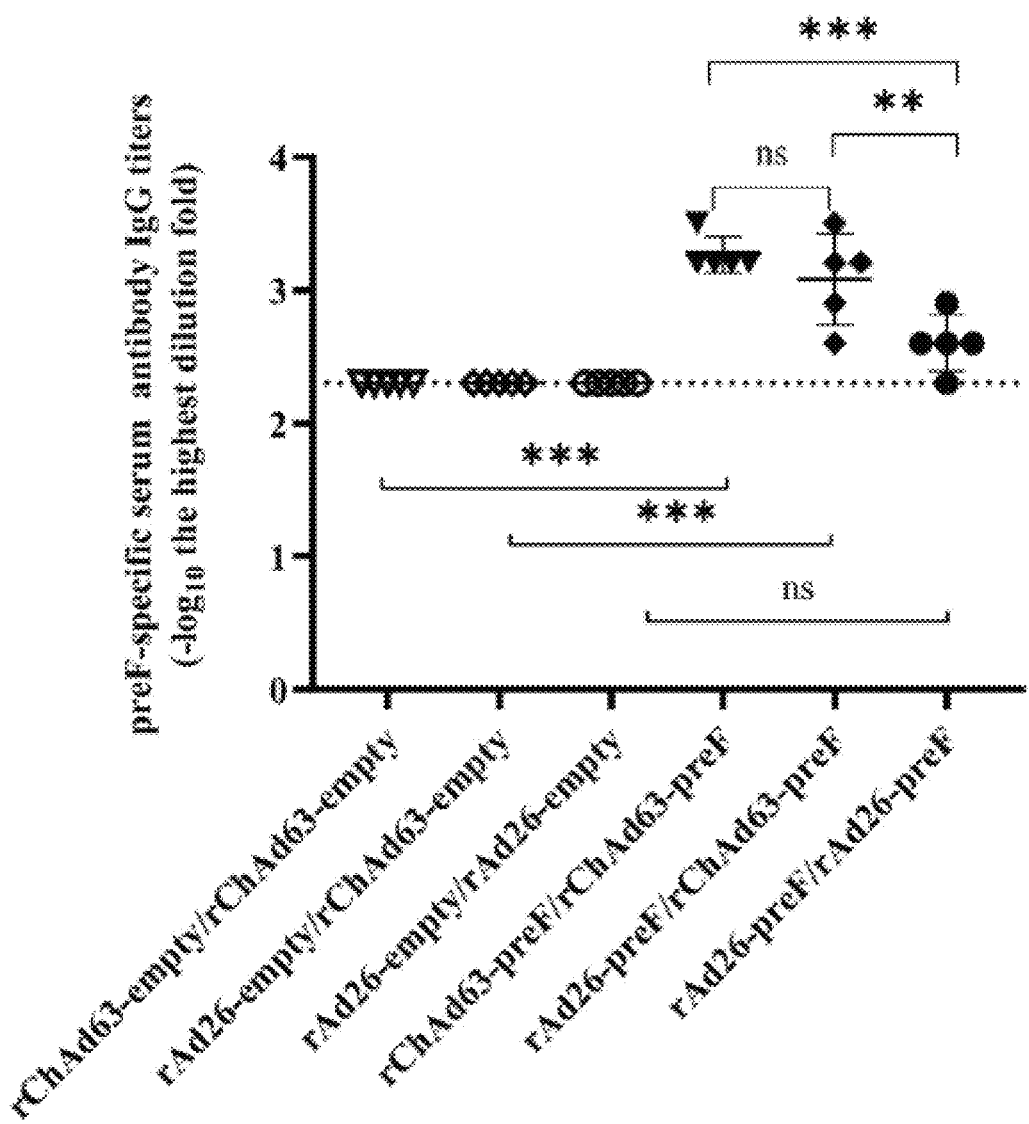
FIG. 1 shows a preF-specific IgG produced by recombinant adenovirus-immunized BALB/c mice provided in examples of the present disclosure.
Figure 2:
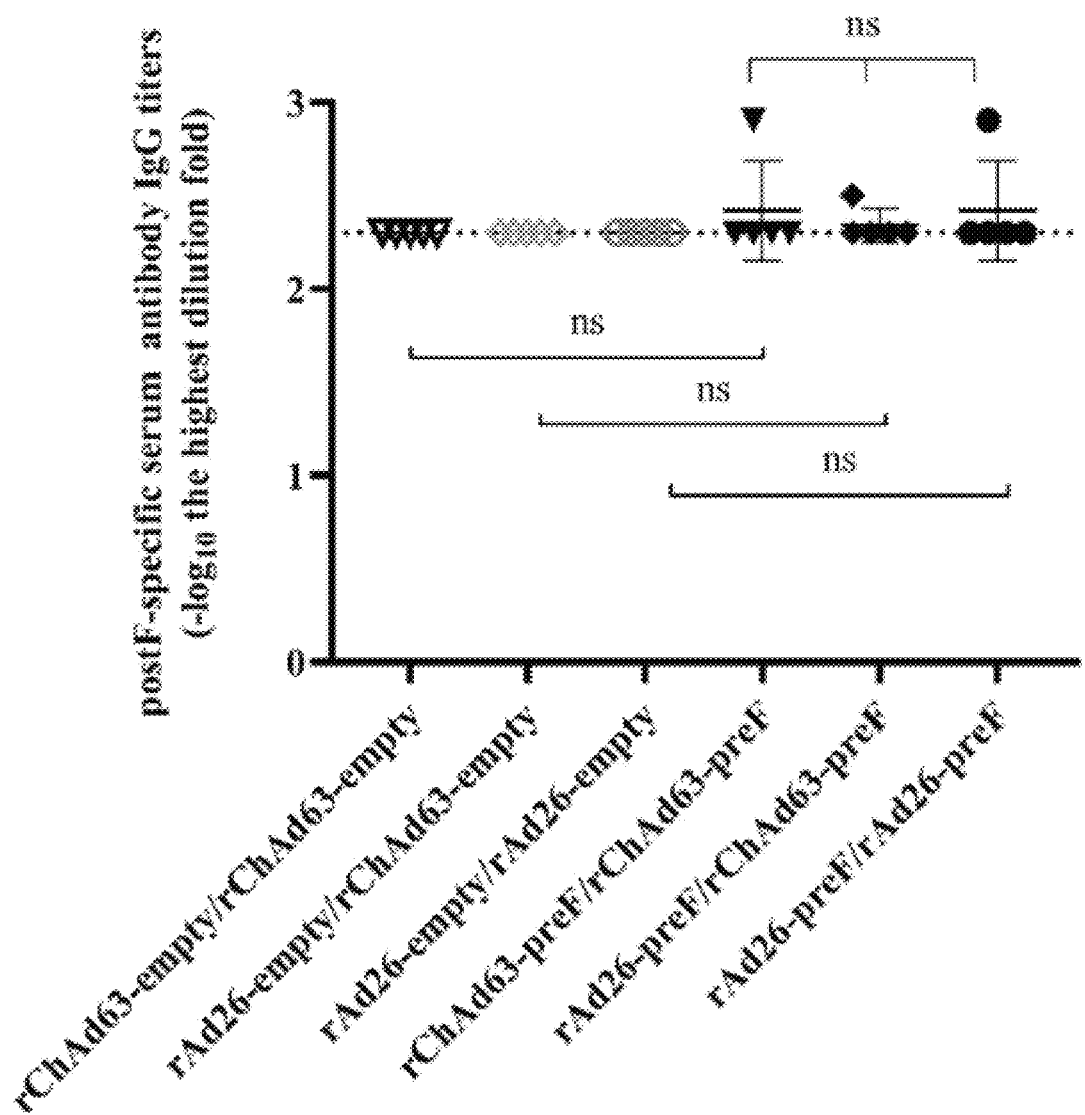
FIG. 2 shows a postF-specific IgG produced by recombinant adenovirus-immunized BALB/c mice provided in examples of the present disclosure.
Figure 3:
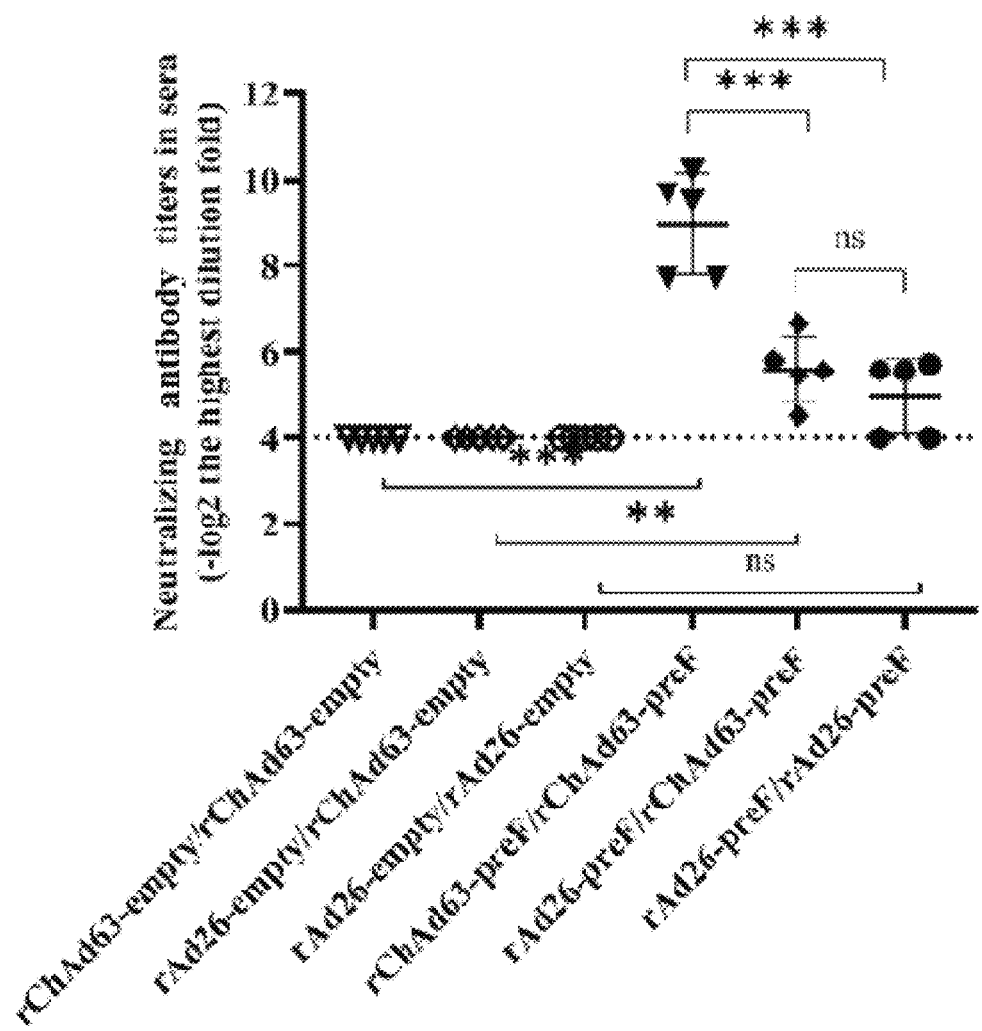
FIG. 3 shows a serum neutralizing antibody produced by recombinant adenovirus-immunized BALB/c mice provided in examples of the present disclosure.
Figure 4:
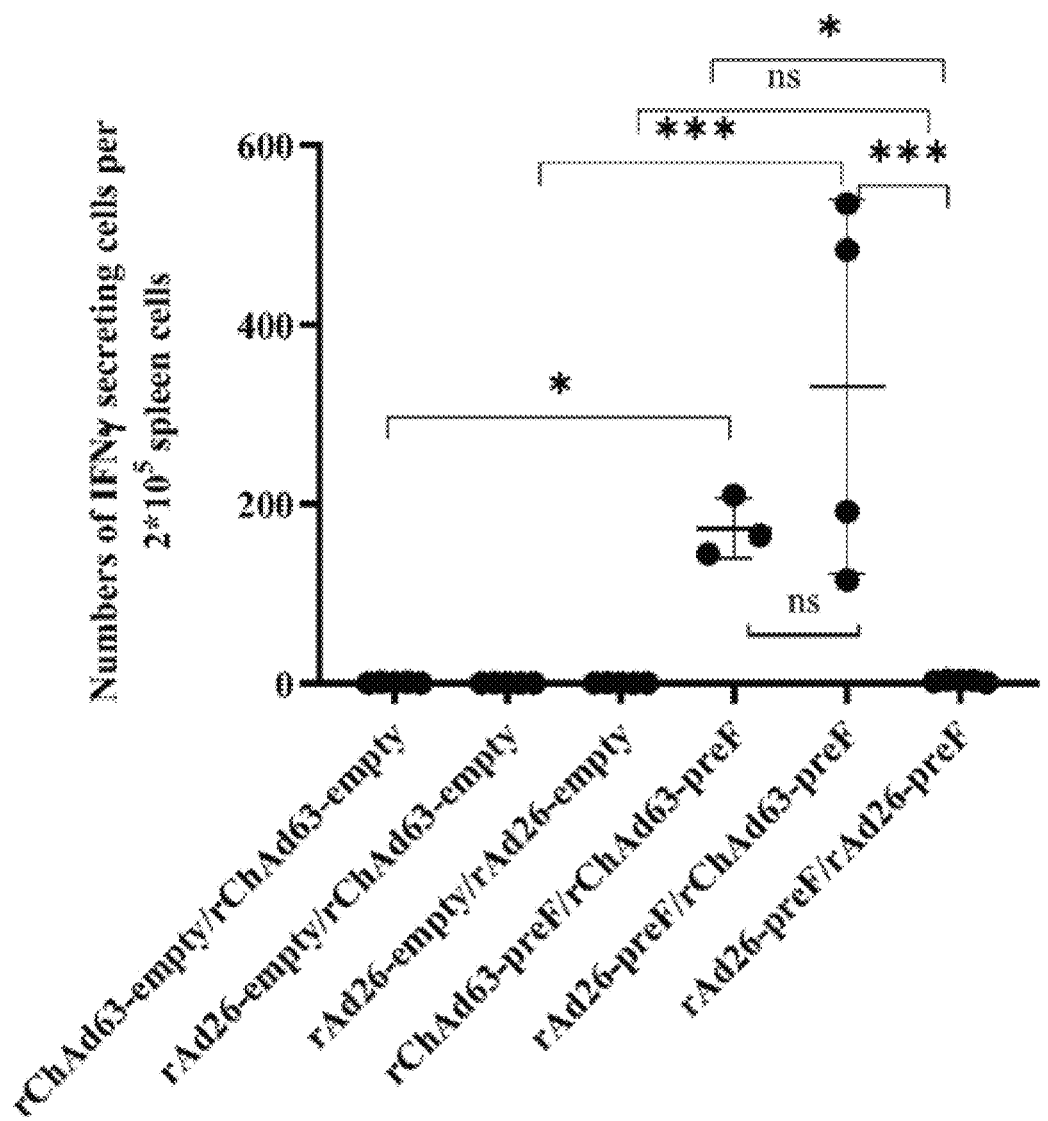
FIG. 4 shows a RSV F-specific CD8+ T cell immune response produced by recombinant adenovirus-immunized BALB/c mice provided in examples of the present disclosure.
Figure 5:
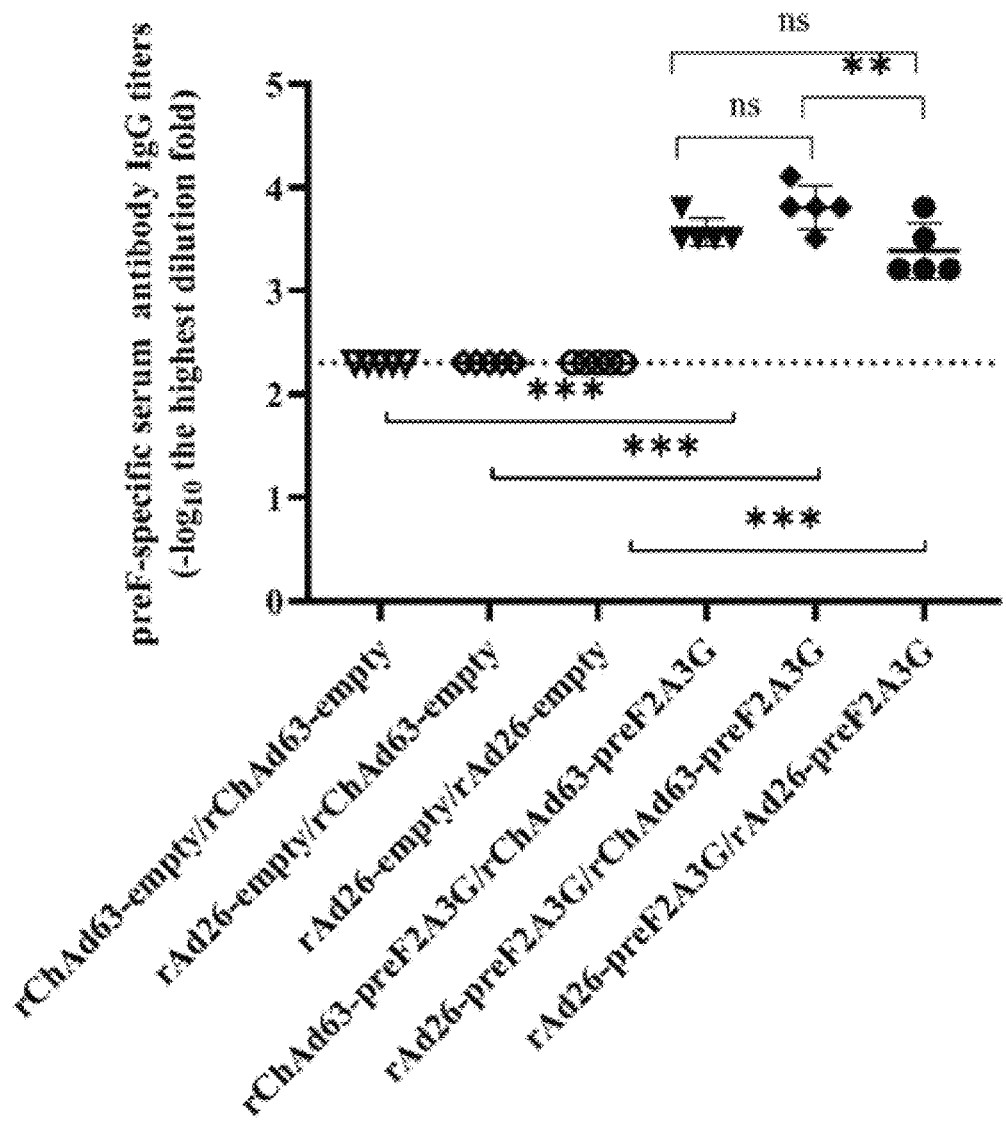
FIG. 5 shows a preF-specific IgG produced by recombinant adenovirus-immunized BALB/c mice provided in examples of the present disclosure.
Figure 6:
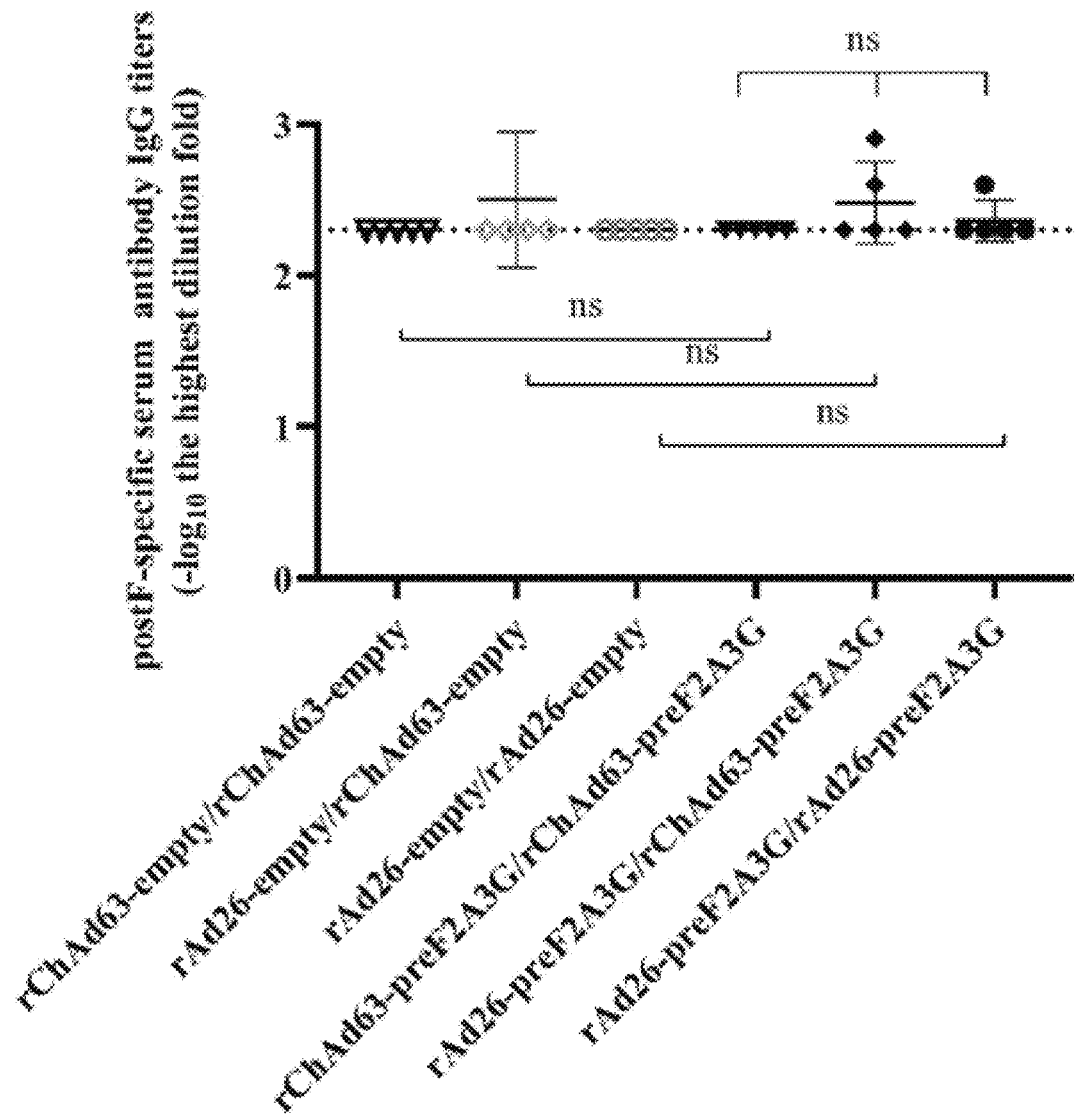
FIG. 6 shows a postF-specific IgG produced by recombinant adenovirus-immunized BALB/c mice provided in examples of the present disclosure.
Figure 7:
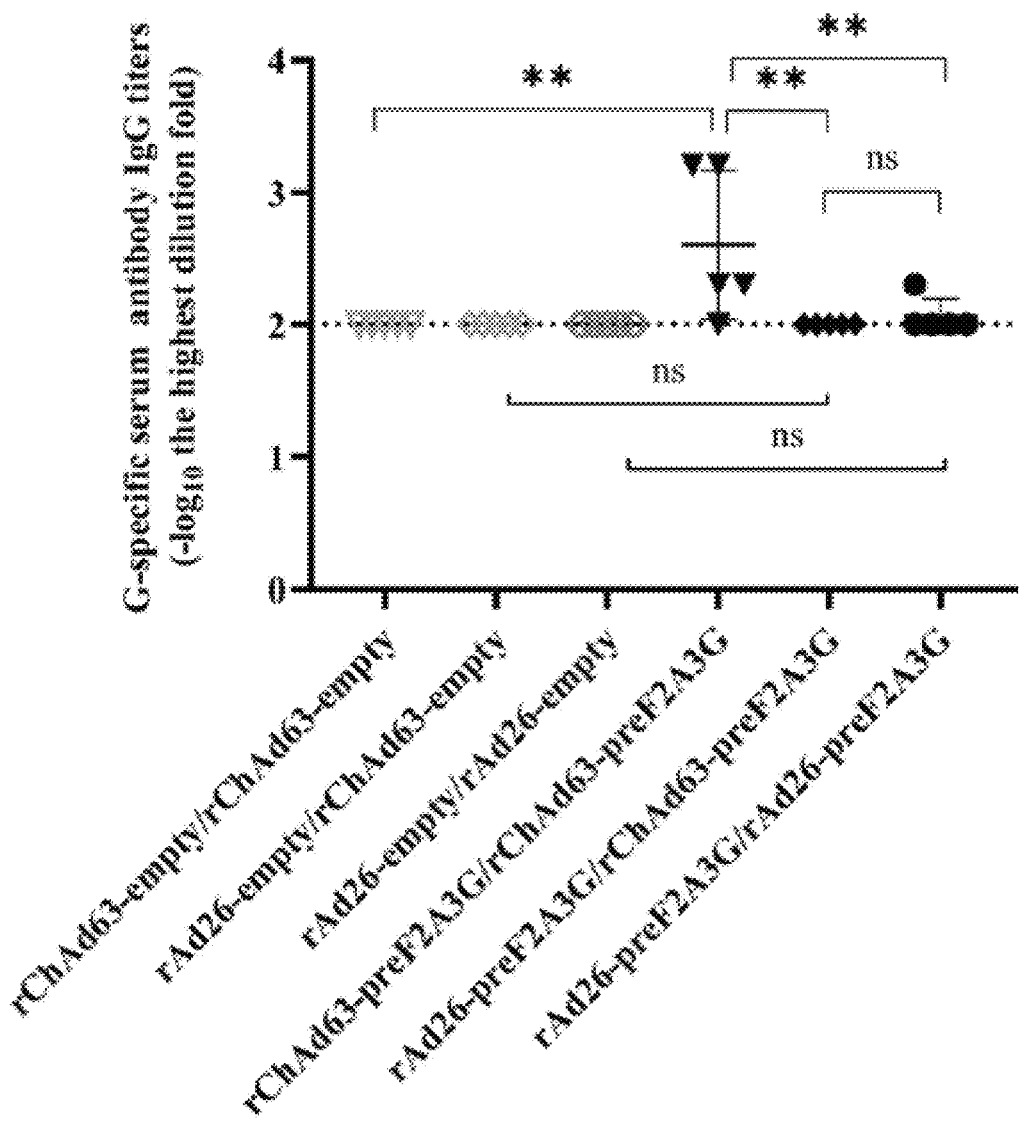
FIG. 7 shows a G-specific IgG produced by recombinant adenovirus-immunized BALB/c mice provided in examples of the present disclosure.
Figure 8:
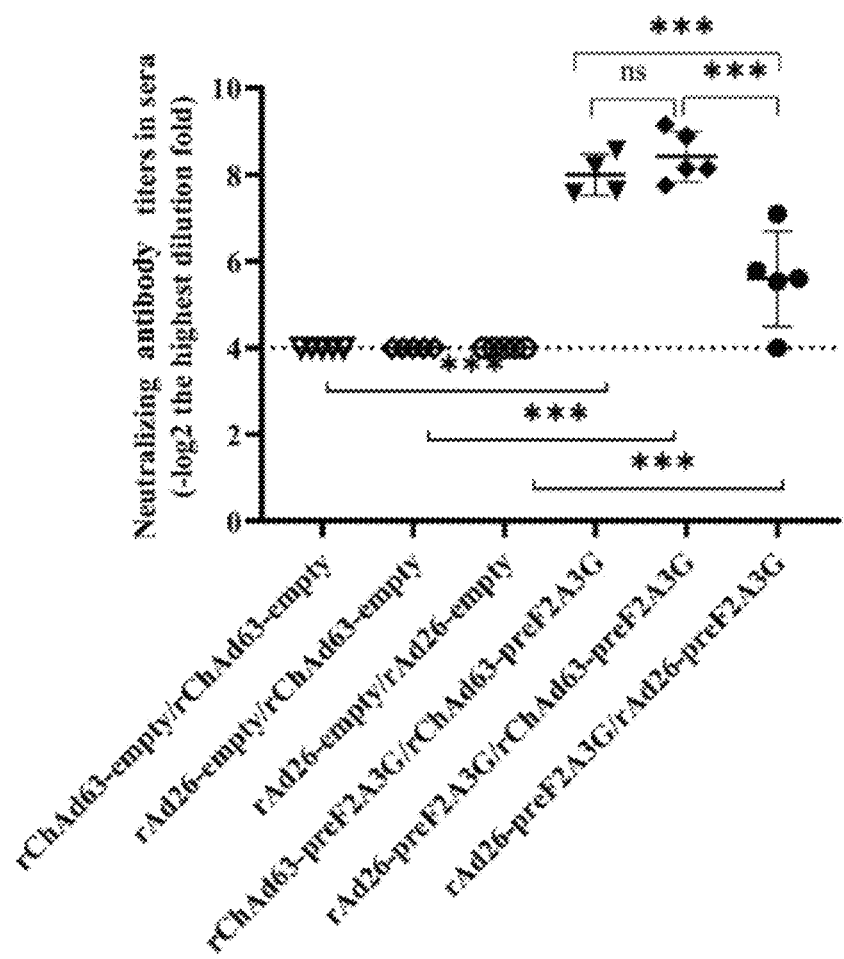
FIG. 8 shows a serum neutralizing antibody produced by recombinant adenovirus-immunized BALB/c mice provided in examples of the present disclosure.
Figure 9:
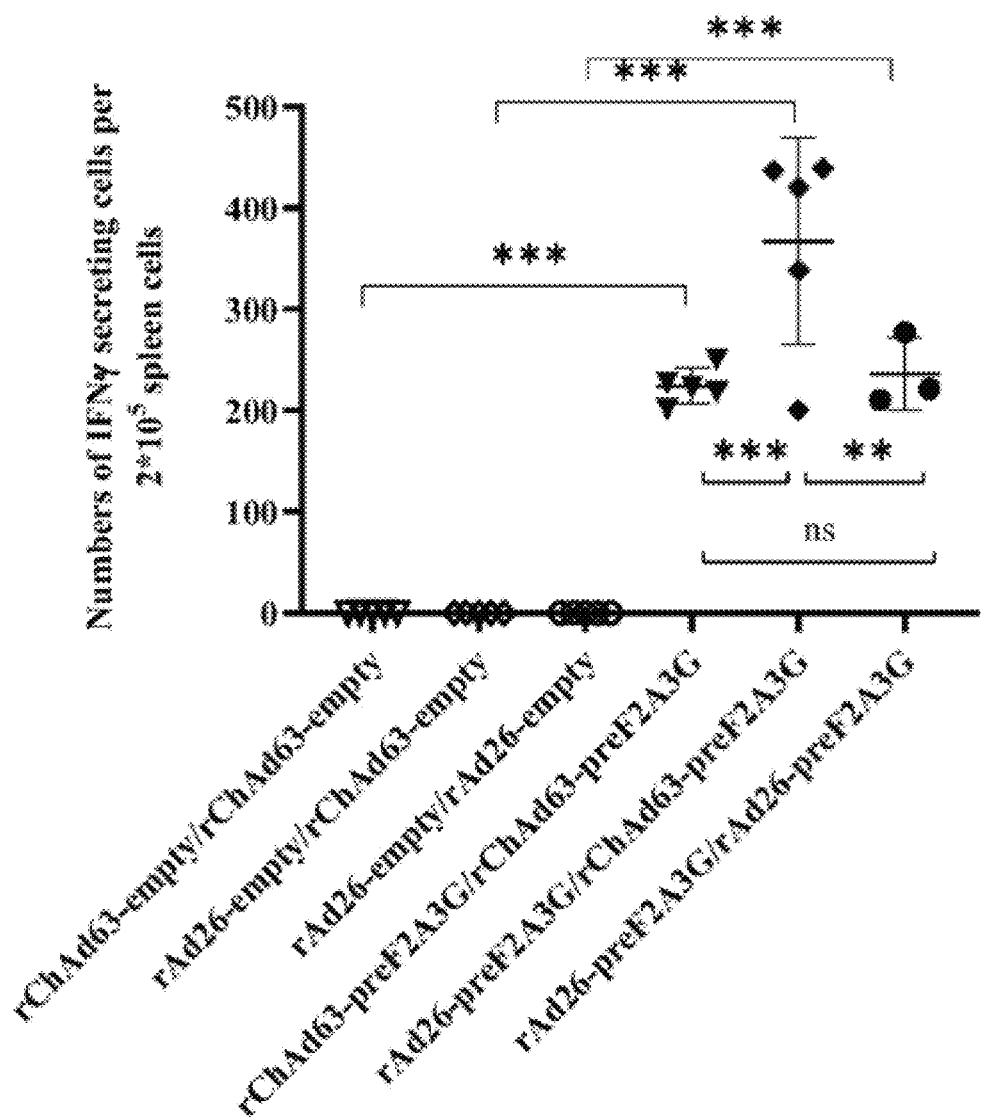
FIG. 9 shows a RSV F-specific CD8+ T cell immune response produced by recombinant adenovirus-immunized BALB/c mice provided in examples of the present disclosure.

Embodiments of the present disclosure are described below in detail. Examples of the embodiments are shown in drawings. The same or similar numerals represent the same or similar elements or elements having the same or similar functions throughout the disclosure. Embodiments described below with reference to drawings are examples, and are only used to explain the present disclosure but should not be construed as a limitation herein.

Those skilled in the art can understand that, unless otherwise stated, the singular forms "a", "an", "said" and "the" used herein may also include plural forms. It should be further understood that the word "comprising" or "including" used in the specification of the present disclosure refers to presence of the described features, integers, steps, operations, elements and/or components, but does not exclude presence or addition of one or more other features, integers, steps, operations, elements, components, and/or groups thereof. It should be understood that when an element is "connected" or "coupled" to another element, it can be connected or coupled to another element directly or through an intermediate element. In addition, "connected" or "coupled" used herein can include wireless connection or coupling. Term "and/or" used herein includes any unit and all combinations of one or more of the associated listed items.

Those skilled in the art can understand that, unless otherwise defined, all terms (including technical terms and scientific terms) used herein have the same meanings as those commonly understood by those of ordinary skill in the art herein. It should also be understood that terms such as those defined in general dictionaries should be understood as having meanings consistent with the meanings in the context of the prior art, and unless otherwise defined herein, are not be explained in ideal or overly-formal meanings.

For ease of understanding of the examples herein, further explanation and description is given by taking several specific examples as examples in conjunction with drawings, and each example does not constitute a limitation to the examples herein.

The present disclosure aims to explore protective immunity against RSV infections by a prime-boost immunization strategy, specifically a composition, a vaccine and a method for the protective immunity against RSV infections.

It is found that a prime-boost combination of a replication-deficient adenovirus vector vaccine produces an effective immune protection against RSV. Therefore, examples of the present disclosure provide a combined vaccine against RSV infections, including: a first composition and a second composition; wherein the first composition includes an immunologically effective dosage of a replication-deficient human adenovirus type 26 vector and a pharmaceutically acceptable vector, and the replication-deficient human adenovirus type 26 vector includes a nucleotide encoding an antigenic protein of RSV;

the second composition includes an immunologically effective dosage of a replication-deficient chimpanzee adenovirus type 63 vector and a pharmaceutically acceptable vector, and the replication-deficient chimpanzee adenovirus type 63 vector includes a nucleotide encoding an antigenic protein of RSV.

In one embodiment of the present disclosure, the first composition is a primary immunization composition and the second composition is a booster immunization composition; alternatively, the first composition is a booster immunization composition, and the second composition is a primary immunization composition.

In one example of the present disclosure, in the first composition, the replication-deficient human adenovirus type 26 vector includes: a nucleotide encoding a pre-fusion fusion glycoprotein (preF) and/or a nucleotide encoding an attachment glycoprotein 130-230aa (G 130-230) of RSV;

wherein the nucleotide encoding the attachment glycoprotein 130-230aa of RSV is abbreviated as: preF2A3G.

In the second composition, the replication-deficient chimpanzee adenovirus type 63 vector includes: a nucleotide encoding preF and/or a nucleotide encoding G 130-230.

In one example of the present disclosure, in the first composition, the replication-deficient human adenovirus type 26 vector includes a nucleotide encoding preF, the nucleotide sequence of which is set forth in SEQ ID NO: 1; or a nucleotide encoding G 130-230, the nucleotide sequence of which is set forth in SEQ ID NO: 2; or a nucleotide encoding both preF and G 130-230, the nucleotide sequence of which is set forth in SEQ ID NO: 3.

In one example of the present disclosure, in the second composition, the replication-deficient chimpanzee adenovirus type 63 vector includes a nucleic acid encoding at least one of three antigenic proteins of RSV In particular, the a nucleic acid encoding at least one of three antigenic proteins of RSV, wherein the nucleic acid comprises the nucleotide sequences that are set forth in SEQ ID NO: 1, SEQ ID NO: 2 and SEQ ID NO: 3.

In one example of the present disclosure, in the first composition, the replication-deficient human adenovirus type 26 vector is rAd26; and in the second composition, the replication-deficient chimpanzee adenovirus type 63 vector is rChAd63.

The examples of the present disclosure further provide a method for inducing an immune response against RSV in the vaccinee, including the following steps:

A. administering the first composition including an immunologically effective amount of an adenovirus vector to a subject, wherein the adenovirus vector includes a nucleotide encoding an antigenic protein of RSV; and B. administering the second composition including an immunologically effective amount of an adenovirus vector to the subject, wherein the adenovirus vector includes a nucleotide encoding the antigenic protein of RSV; wherein step (A) and step (B) are conducted in any order.

Example 1

Prime-Boost Immunization of a Recombinant Adenovirus Encoding a pre-Fusion Fusion Glycoprotein (preF) of RSV I. Animal Immunity Female BALB/c mice aged 6-8 weeks were divided into 6 groups; on day 0, a basal serum was collected; on day 1, first immunization was conducted by intramuscular injection. On the 21st day after immunization, blood was collected after the first immunization. On the 28th day, second immunization was conducted by intramuscular injection. On the 49th day, blood was collected after the second immunization. On the 56th day, a challenge experiment was conducted via an intranasal route, and a challenge dosage was $1\times10^6$ pfu/50 μl of wtRSV.

Grouping and processing were as follows:

a first group (group G1): secondary immunization was conducted by intramuscular injection; wherein a primary immunizer was an rChAd63/empty virus solution (with a viral load of $1\times10^{10}$ vp), and a secondary immunizer was an rChAd63/empty virus solution (with a viral load of $1\times10^{10}$ vp);

a second group (group G2): secondary immunization was conducted by intramuscular injection; wherein a primary immunizer was an rAd26/empty virus solution (with a viral load of $1\times10^{10}$ vp), and a secondary immunizer was an rAd63/empty virus solution (with a viral load of $1\times10^{10}$ vp);

a third group (group G3 group): secondary immunization was conducted by intramuscular injection; wherein a primary immunizer was an rAd26/empty virus solution (with a viral load of $1\times10^{10}$ vp), and a secondary immunizer was an rChAd26/empty virus solution (with a viral load of $1\times10^{10}$ vp);

a fourth group (group G4): secondary immunization was conducted by intramuscular injection; wherein a primary immunizer was an rChAd63/preF virus solution (with a viral load of $1\times10^{10}$ vp), and a secondary immunizer was an rChAd63/preF virus solution (with a viral load of $1\times10^{10}$ vp);

a fifth group (group G5): secondary immunization was conducted by intramuscular injection; wherein a primary immunizer was an rAd26/preF virus solution (with a viral load of $1\times10^{10}$ vp), and a secondary immunizer was an rAd63/preF virus solution (with a viral load of $1\times10^{10}$ vp); and a sixth group (group G6): secondary immunization was conducted by intramuscular injection; wherein a primary immunizer was an rAd26/preF virus solution (with a viral load of $1\times10^{10}$ vp), and a secondary immunizer was an rChAd26/preF virus solution (with a viral load of $1\times10^{10}$ vp).

II. Detection of IgG in Serum of Mice after Immunization

A solution to be tested was: serum isolated and obtained from venous blood of mice collected on the 49th day after immunization in step I.

A serum antibody titer was detected in mice by enzyme-linked immunosorbent assay (ELISA). Purified RSV was coated on a microtiter plate at 2,500 pfu/well, a pre-fusion F protein (preF) was coated on a microtiter plate at 450 ng/well, and a post-fusion F protein (postF) was coated on a microtiter plate at 1,200 ng/well, and serum antibody IgG in mice was detected by ELISA.

III. Serum Neutralizing Antibodies of Immunized Mice

1. HEp-2 cells were inoculated onto a 96-well plate at density of $2.0\times10^4$ cells/well, and cultured for 24 h.

2. Serum of the immunized mice was inactivated at 56° C. for 30 min, and diluted twice with a Dulbecco's Modified Eagle Medium (DMEM) medium containing 2% fetal bovine serum. RSV-mGFP was added to the sera of different dilutions with a final concentration to 1000 PFU/100 μl, and the sera were mixed then incubated at 37° C. for 1 h.

3. A medium of the 96-well plate was discarded, the plate was washed 1-2 times with PBS, and 100 μl of a mixture (containing 1000 PFU of RSV-mGFP) was added to the 96-well plate plated with a monolayer of HEp-2 cells, followed by incubation at 37° C. for 48 h. At the same time, a blank control group (no virus, no serum or antibody), a negative control group (with RSV-mGFP, no serum) and a positive control group (RSV polyclonal antibody alternative serum) were set up, and cultured for 2 d.

4. After completing step 3, a fluorescence intensity of green fluorescent proteins in each well was detected using a multifunctional microplate reader SpectraMax M5e at an excitation wavelength 479 nm and an emission wavelength 517 nm for 10 sec.

5. The blank control group was subtracted from the experimental group, the negative control group and the positive control group, respectively, and a linear regression equation of the experimental group was established by SPSS; an antibody titer with a 50% reduction in fluorescence intensity ($IC_{50}$) was calculated by the linear regression equation.

IV. Analysis of an Cellular Immune Effect of Immunized Mice

Cells to be tested were: spleen cells of mice on the 49th day after immunization in step I.

1. Mice of 49 d after immunization were sacrificed by cervical dislocation, and spleen cells were collected aseptically in an ultra-clean bench.

2. An effect of cellular immunity was analyzed by an enzyme-linked immunobsorbent spot (ELISPOT) method, and a number of spleen lymphocytes secreting IFN-7 after stimulation with H-2K d-restricted CTL epitope of a RSV F protein was counted.

3. In an ultra-clean bench, 200 μl of a 1640 medium was added to each well, and after standing at room temperature for 5-10 min, the 1640 medium was discarded.

4. A cell suspension was added to each experimental well at 100 μl/well. $2 \times 10^5$ cells/well were added to positive control wells, negative control wells and experimental wells, while no cells were added to background control wells.

5. A volume of stimulus added to each well was 10 μl/well; a positive stimulus working solution was added to positive control wells; a serum-free 1640 medium was added to negative control wells and the background control wells; RSV F protein H-2K d-restricted CTL epitopes (KYKNAV-TEL (SEQ ID NO:4) and TYMLTNSELL (SEQ ID NO:5), purity ≥95%) were added to the experimental wells (0.5 μg each of KYKNAVTEL (SEQ ID NO:4) and TYMLTNSELL (SEQ ID NO:5) was added to $2 \times 10^5$ cells); and incubation was conducted in an incubator at 37° C., with 5% $CO_2$ for 24-48 h.

6. After completing step 5, cells and medium in the well were poured out, and ice-cold deionized water was added at 200 μl/well; the cells were placed in a refrigerator at 4° C. for 10 min to conduct hypotonic lysis of cells.

7. Liquid in the well was poured out, followed by washing 5-7 times with 1×Washing buffer, at 200 μl/well, each time for 30-60 sec, and dried on an absorbent paper.

8. A diluted and biotin-labeled antibody working solution was added to each experimental well, at 100 μl/well, followed by incubation at 37° C. for 1 h.

9. After completing step 8, liquid in the well was poured out, followed by washing 5-7 times with 1×Washing buffer, at 200 l/well, each time for 30-60 sec, and dried on an absorbent paper.

10. A diluted and enzyme-labeled avidin working solution was added to each experimental well, at 100 μl/well, followed by incubation at 37° C. for 1 h.

11. Liquid in the well was poured out, followed by washing 5-7 times with 1×Washing buffer, at 200 μl/well, each time for 30-60 sec, and dried on an absorbent paper.

12. A newly-prepared color developer working solution AEC was added to each experimental well, at 100 μl/well, and allowed to stand at room temperature for 15-45 min.

13. After spots had grown to a suitable size, liquid in the well was poured out, a base of a plate was uncovered, and washed with deionized water for 3-5 times to terminate color development; the plate was placed in a cool place at room temperature to dry naturally until it was completely dry; a 96-well plate was imaged with an ELISPOT reader, and a number of spots was read and analyzed with ImmunoSpot image analyzer software v4.0.

Example 2

Prime-Boost Immunization of a Recombinant Adenovirus Co-Expressing a pre-Fusion Fusion Glycoprotein (preF) and an Attachment Glycoprotein of RSV.

I. Animal Immunity

Female BALB/c mice aged 6-8 weeks were divided into 6 groups; on day 0, a basal serum was collected; on day 1, first immunization was conducted by intramuscular injection. On the 21st day after immunization, blood was collected after the first immunization. On the 28th day, second immunization was conducted by intramuscular injection. On the 49th day, blood collection was conducted continuously after the second immunization. On the 56th day, a challenge experiment was conducted via an intranasal route, wherein a challenge dosage was $1 \times 10^6$ pfu/50 μl of wtRSV Grouping and processing were as follows:
- a first group (group G1): secondary immunization was conducted by intramuscular injection; wherein a primary immunizer was an rChAd63/empty virus solution (with a viral load of $1 \times 10^{10}$ vp), and a secondary immunizer was an rChAd63/empty virus solution (with a viral load of $1 \times 10^{10}$ vp);
- a second group (group G2): secondary immunization was conducted by intramuscular injection; wherein a primary immunizer was an rAd26/empty virus solution (with a viral load of $1 \times 10^{10}$ vp), and a secondary immunizer was an rAd63/empty virus solution (with a viral load of $1 \times 10^{10}$ vp);
- a third group (group G3): secondary immunization was conducted by intramuscular injection; wherein a primary immunizer was an rAd26/empty virus solution (with a viral load of $1 \times 10^{10}$ vp), and a secondary immunizer was an rChAd26/empty virus solution (with a viral load of $1 \times 10^{10}$ vp);
- a fourth group (group G4): secondary immunization was conducted by intramuscular injection; wherein a primary immunizer was an rChAd63/preF2A3G virus solution (with a viral load of $1 \times 10^{10}$ vp), and a secondary immunizer was an rChAd63/preF2A3G virus solution (with a viral load of $1 \times 10^{10}$ vp);
- a fifth group (group G5): secondary immunization was conducted by intramuscular injection; wherein a primary immunizer was an rAd26/preF2A3G virus solution (with a viral load of $1 \times 10^{10}$ vp), and a secondary immunizer was an rAd63/preF2A3G virus solution (with a viral load of $1 \times 10^{10}$ vp); and
- a sixth group (group G6): secondary immunization was conducted by intramuscular injection; wherein a primary immunizer was an rAd26/preF2A3G virus solution (with a viral load of $1 \times 10^{10}$ vp), and a secondary immunizer was an rChAd26/preF2A3G virus solution (with a viral load of $1 \times 10^{10}$ vp).

II. Detection of IgG in Serum of Mice after Immunization

A solution to be tested was: serum isolated and obtained from venous blood of mice collected on the 49th day after immunization in step I.

A serum antibody titer was detected in mice by enzyme-linked immunosorbent assay (ELISA). Purified RSV was coated on a microtiter plate at 2,500 pfu/well, a pre-fusion F protein (preF) was coated on a microtiter plate at 450 ng/well, the post-fusion F protein (postF) was coated on a microtiter plate at 1,200 ng/well, and a G protein was coated on a microtiter plate at 1,600 ng/well, and a serum antibody IgG in mice was detected by ELISA.

III. Serum Neutralizing Antibodies of Immunized Mice

1. HEp-2 cells were inoculated onto a 96-well plate at a density of $2.0 \times 10^4$ cells/well, and cultured for 24 h.

2. Serum of the immunized mouse was inactivated at 56° C. for 30 min, and diluted twice with a Dulbecco's Modified Eagle Medium (DMEM) medium containing 2% fetal bovine serum. RSV-mGFP was added to the sera of different dilutions with a final concentration to 1000 PFU/100 µl, and the sera were mixed then incubated at 37° C. for 1 h.

3. A medium of the 96-well plate was discarded, the plate was washed 1-2 times with PBS, 100 µl of a mixture (containing 1000 PFU of RSV-mGFP) was added to the 96-well plate plated with a monolayer of the HEp-2 cells, followed by incubation at 37° C. for 48 h. At the same time, a blank control group (no virus, no serum or antibody), a negative control group (with RSV-mGFP, no serum) and a positive control group (RSV polyclonal antibody alternative serum) were set up, and cultured for 2 d.

4. After completing step 3, a fluorescence intensity of green fluorescent proteins in each well was detected using a multifunctional microplate reader SpectraMax M5e at an excitation wavelength 479 nm and an emission wavelength 517 nm for 10 sec.

5. The blank control group was subtracted from the experimental group, the negative control group and the positive control group, respectively, and a linear regression equation of the experimental group was established by SPSS; an antibody titer with a 50% reduction in fluorescence intensity ($IC_{50}$) was calculated by the linear regression equation.

IV. Analysis of an Cellular Immune Effect of Immunized Mice

Cells to be tested were: spleen cells of mice on the 49th day after immunization in step I.

1. Mice of 49 d after immunization were sacrificed by cervical dislocation, and spleen cells were collected aseptically in an ultra-clean bench.

2. An effect of cellular immunity was analyzed by an enzyme-linked immunobsorbent spot (ELISPOT) method, and a number of spleen lymphocytes secreting IFN-7 after stimulation with H-2K d-restricted CTL epitope of a RSV F protein was counted.

3. In the ultra-clean bench, 200 µl of a 1640 medium was added to each well, and after standing at room temperature for 5-10 min, the 1640 medium was discarded.

4. A cell suspension was added to each experimental well, at 100 µl/well. $2\times10^5$ cells/well were added to positive control wells, negative control wells and experimental wells, while no cells were added to background control wells.

5. A volume of stimulus added to each well was 10 µl/well; a positive stimulus working solution was added to the positive control wells; a serum-free 1640 medium was added to the negative control wells and the background control wells; and RSV F protein H-2K d-restricted CTL epitopes (KYKNAVTEL (SEQ ID NO:4) and TYMLTNSELL (SEQ ID NO:5), purity ≥95%) were added to the experimental wells (0.5 µg each of KYKNAVTEL (SEQ ID NO:4) and TYMLTNSELL (SEQ ID NO:5) was added to $2\times10^5$ cells); and incubation was conducted in an incubator at 37° C., with 5% $CO_2$ for 24-48 h.

6. After completing step 5, cells and medium in the well were poured out, and ice-cold deionized water was added at 200 µl/well; the cells were placed in a refrigerator at 4° C. for 10 min to conduct hypotonic lysis of cells.

7. Liquid in the well was poured out, followed by washing 5-7 times with 1×Washing buffer, at 200 µl/well, each time for 30-60 sec, and dried on an absorbent paper.

8. A diluted and biotin-labeled antibody working solution was added to each experimental well, at 100 µl/well, followed by incubation at 37° C. for 1 h.

9. After completing step 8, liquid in the well was poured out, followed by washing 5-7 times with 1×Washing buffer, at 200 µl/well, each time for 30-60 sec, and dried on an absorbent paper.

10. A diluted and enzyme-labeled avidin working solution was added to each experimental well, at 100 µl/well, followed by incubation at 37° C. for 1 h.

11. Liquid in the well was poured out, followed by washing 5-7 times with 1×Washing buffer, at 200 µl/well, each time for 30-60 sec, and dried on an absorbent paper.

12. A newly-prepared color developer working solution AEC was added to each experimental well, at 100 µl/well, and allowed to stand at room temperature for 15-45 min.

13. After spots had grown to a suitable size, liquid in the well was poured out, a base of a plate was uncovered, and washed with deionized water for 3-5 times to terminate the color development; the plate was placed in a cool place at room temperature to dry naturally until it was completely dry; the 96-well plate was imaged with an ELISPOT reader, and a number of spots was read and analyzed with ImmunoSpot image analyzer software v4.0.

The above described are merely specific embodiments of the present disclosure, and the protection scope herein is not limited thereto. Any modification or replacement easily conceived by those skilled in the art within the technical scope of the present disclosure should fall within the claimed scope herein. Therefore, the claimed scope of the present disclosure should be subject to the claimed scope of the claims.

SEQUENCE LISTING

```
<160> NUMBER OF SEQ ID NOS: 5

<210> SEQ ID NO 1
<211> LENGTH: 1659
<212> TYPE: DNA
<213> ORGANISM: Artificial Sequence
<220> FEATURE:
<223> OTHER INFORMATION: Nucleotide sequence of Pre-fusion fusion
      glycoprotein

<400> SEQUENCE: 1
atggaactgc tgatcctgaa ggccaacgcc atcaccacca tcctgaccgc tgtgaccttc      60
tgcttcgcca gcggccagaa catcaccgag gaattctacc agagcacctg tagcgccgtg     120
tccaagggct acctgagcgc cctgcggacc ggctggtaca ccagcgtgat caccatcgag     180
ctgagcaaca tcaagaaaat caagtgcaac ggcaccgacg ccaagatcaa gctgatcaag     240
```

```
caggaactgg acaagtacaa gaacgccgtg accgagctgc agctgctgat gcagagcacc      300
cccgccacca acaaccaggc tagaggcagc ggaagcggac ggtccctggg cttcctgctg      360
ggcgtgggca gcgccattgc tagcggagtg gccgtgtcaa aggtgctgca cctggaaggc      420
gaagtgaaca agatcaagtc cgccctgctg agcaccaaca aggccgtggt gtccctgagc      480
aacggcgtgt ccgtgctgac cagcaaggtg ctggatctga agaactacat cgacaagcag      540
ctgctgccca tcgtgaacaa gcagagctgc agcatcccca catcgagac agtgatcgag       600
ttccagcaga agaacaaccg gctgctggaa atcacccgcg agttcagcgt gaacgccggc      660
gtgaccaccc ccgtgtccac ctacatgctg accaacagcg agctgctgag cctgatcaac      720
gacatgccca tcaccaacga ccagaaaaag ctgatgagca caacgtgca gatcgtgcgg       780
cagcagagct actccatcat gagcatcatc aaagaagagg tgctggccta cgtggtgcag      840
ctgcccctgt acggcgtgat cgacaccccc tgctggaagc tgcacaccag cccctgtgc      900
accaccaaca ccaaagaggg cagcaacatc tgcctgaccc ggaccgaccg gggctggtac      960
tgcgataatg ccggcagcgt gtcattcttt ccacaagccg acatgcaa ggtgcagagc       1020
aaccgggtgt tctgcgacac catgaacagc ctgaccctgc cctccgaagt gaacctgtgc      1080
aacgtggaca tcttcaaccc taagtacgac tgcaagatca tgacctccaa gaccgacgtg     1140
tccagctccg tgatcaccte cctgggcgcc atcgtgtcct gctacggcaa gaccaagtgc      1200
accgccagca acaagaaccg gggcatcatc aagaccttca gcaacggctg cgactacgtg     1260
tccaacaagg gggtggacac cgtgtccgtg ggcaacaccc tgtactacgt gaacaaacag     1320
gaaggcaaga gcctgtacgt gaagggcgag cccatcatca acttctacga ccccctggtg    1380
ttccccagcg accagttcga cgccagcatc agccaggtca cgagaagat caaccagagc     1440
ctggccttca tcagaaagag cgacgagctg ctgcacaatg tgaatgccgt gaagtccacc     1500
accaatatca tgatcaccac aatcatcatc gtgatcatcg tcatcctgct gtccctgatc    1560
gccgtgggcc tgctgctgta ctgcaaggcc cggtccaccc ctgtgaccct gtccaaggac   1620
cagctgagcg gcatcaacaa tatcgccttc tccaactga                            1659
```

<210> SEQ ID NO 2
<211> LENGTH: 1014
<212> TYPE: DNA
<213> ORGANISM: Artificial Sequence
<220> FEATURE:
<223> OTHER INFORMATION: Nucleotide sequence of attachment glycoprotein 130-230aa

<400> SEQUENCE: 2

```
atggacgcca tgaagagggg cctgtgctgc gtgctgctgc tgtgcggcgc cgtgttcgtg      60
agccccagca ccgtgaaaac aaagaacacc accaccaccc agaccccagcc cagcaagccc     120
accaccaagc agcggcagaa caagcccccc aacaagccca caacgactt ccacttcgag      180
gtgttcaact tcgtgcccctg cagcatctgc agcaacaacc ctacctgctg gccatctgc      240
aagcggaagc ctaacaagaa gcccggcaag aaaaccacca caaagcccac caagaagcct     300
accttcaaga ccacaaagaa ggacctgaag ccccagacca ccaagcccaa agaggtgccc    360
accactaagc ccgaggcgg cggatccaca gtgaaaacta agaataccac aacaacacag     420
acacagccctt ccaagcctac aacaaaacag aggcagaaca acctcctaa caaacctaac   480
aatgatttc actttgaagt gttcaatttt tgtgccttgct ccatctgctc caacaatcca     540
acatgttggg ctatctgtaa acgcaaaccc aacaagaaac ctgggaaaaa gaccaccacc    600
```

| | |
|---|---|
| aaacctacaa agaaacccac ctttaaaacc accaagaaag atctgaaacc tcagacaaca | 660 |
| aaacctaaag aagtgcctac taccaagccc ggaggcggcg gatccaccgt gaaaacaaaa | 720 |
| aacacaacaa caactcagac tcagccctct aaacccacaa ctaagcagag acagaacaag | 780 |
| cctccaaaca agccaaacaa tgatttccat ttcgaagtgt ttaactttgt gccatgttct | 840 |
| atctgttcta acaatcccac ttgttgggcc atctgcaaaa gaaagccaaa caaaaacccc | 900 |
| ggcaaaaaga caacaactaa gcctaccaaa agcccacat tcaaaactac caaaaaggat | 960 |
| ctgaagccac agacaactaa gccaaaagaa gtgcccacaa caaaaccctg ataa | 1014 |

<210> SEQ ID NO 3
<211> LENGTH: 2736
<212> TYPE: DNA
<213> ORGANISM: Artificial Sequence
<220> FEATURE:
<223> OTHER INFORMATION: Nucleotide sequence of Pre-fusion fusion glycoprotein and attachment glycoprotein 130-230aa

<400> SEQUENCE: 3

```
atggaactgc tgatcctgaa ggccaacgcc atcaccacca tcctgaccgc tgtgaccttc      60
tgcttcgcca gcggccagaa catcaccgag gaattctacc agagcacctg tagcgccgtg     120
tccaagggct acctgagcgc cctgcggacc ggctggtaca ccagcgtgat caccatcgag     180
ctgagcaaca tcaagaaaat caagtgcaac ggcaccgacg ccaagatcaa gctgatcaag     240
caggaactgg acaagtacaa gaacgccgtg accgagctgc agctgctgat gcagagcacc     300
cccgccacca acaaccaggc tagaggcagc ggaagcggac ggtccctggg cttcctgctg     360
ggcgtgggca gcgccattgc tagcggagtg gccgtgtcaa aggtgctgca cctggaaggc     420
gaagtgaaca agatcaagtc cgccctgctg agcaccaaca aggccgtggt gtccctgagc     480
aacggcgtgt ccgtgctgac cagcaaggtg ctggatctga agaactacat cgacaagcag     540
ctgctgccca tcgtgaacaa gcagagctgc agcatcccca acatcgagac agtgatcgag     600
ttccagcaga agaacaaccg gctgctggaa atcacccgcg agttcagcgt gaacgccggc     660
gtgaccaccc ccgtgtccac ctacatgctg accaacagcg agctgctgag cctgatcaac     720
gacatgccca tcaccaacga ccagaaaaag ctgatgagca acaacgtgca gatcgtgcgg     780
cagcagagct actccatcat gagcatcatc aaagaagagg tgctggccta cgtggtgcag     840
ctgcccctgt acggcgtgat cgacaccccc tgctggaagc tgcacaccag cccccctgtgc    900 accaccaaca ccaaagaggg cagcaacatc tgcctgaccc ggaccgaccg gggctggtac     960
tgcgataatg ccggcagcgt gtcattcttt ccacaagccg agacatgcaa ggtgcagagc    1020
aaccgggtgt tctgcgacac catgaacagc ctgaccctgc cctccgaagt gaacctgtgc    1080
aacgtggaca tcttcaaccc taagtacgac tgcaagatca tgacctccaa gaccgacgtg    1140
tccagctccg tgatcacctc cctgggcgcc atcgtgtcct gctacggcaa gaccaagtgc    1200
accgccagca acaagaaccg gggcatcatc aagaccttca gcaacggctg cgactacgtg    1260
tccaacaagg gggtggacac cgtgtccgtg ggcaacaccc tgtactacgt gaacaaacag    1320
gaaggcaaga gcctgtacgt gaagggcgag cccatcatca acttctacga ccccctggtg    1380
ttccccagcg accagttcga cgccagcatc agccaggtca acgagaagat caaccagagc    1440
ctggccttca tcagaaagag cgacgagctg ctgcacaatg tgaatgccgt gaagtccacc    1500
accaatatca tgatcaccac aatcatcatc gtgatcatcg tcatcctgct gtccctgatc    1560
gccgtgggcc tgctgctgta ctgcaaggcc cggtccaccc ctgtgaccct gtccaaggac    1620
```

```
cagctgagcg gcatcaacaa tatcgccttc tccaacgagg gccgcggcag cctgct tide encoding an attachment glycoprotein 130-230aa (G 130-230) of RSV, the nucleotide sequence of which is set forth in SEQ ID NO: 2: or wherein in the first composition, the replication-deficient human adenovirus type 26 vector comprises a nucleotide encoding both a pre-fusion fusion glycoprotein (preF) and G 130-230 of RSV, the nucleotide sequence of which is set forth in SEQ ID NO: 3.

2. The combined vaccine according to claim 1, wherein in the second composition, the replication-deficient chimpanzee adenovirus type 63 vector comprises a nucleotide encoding preF and/or a nucleotide encoding G 130-230aa.

3. The combined vaccine according to claim 1, wherein in the second composition, the replication-deficient chimpanzee adenovirus type 63 vector comprises a nucleic acid encoding at least one of three antigenic proteins of RSV.

4. The combined vaccine according to claim 3, wherein the nucleic acid encoding at least three antigenic proteins of RSV, wherein the nucleic acid comprises the nucleotide sequences that are set forth in SEQ ID NO: 1, SEQ ID NO: 2 and SEQ ID NO: 3.

5. The combined vaccine according to claim 1, wherein in the first composition, the replication-deficient human adenovirus type 26 vector is rAd26; and in the second composition, the replication-deficient chimpanzee adenovirus type 63 vector is rChAd63.

6. The combined vaccine according to claim 1, wherein the combined vaccine is used to generate a protective immunity against RSV infection; wherein the first composition is used to elicit an immune response and the second composition is used to boost the immune response; alternatively, the second immunizer is used to elicit the immune response and the first composition is used to boost the immune response.

7. A method for inducing a protective immunity against RSV infection by the combined vaccine according to claim 1, comprising the following steps:

A, administering the first composition to a subject; and

B, administering the second composition to the subject; wherein step A and step B are conducted in any order.

8. The method according to claim 7, wherein the subject comprises a human or a mouse.

9. The method according to claim 8, wherein when the subject is the mouse, the first composition is administered at a dosage of $1\times10^{10}$ vp and the second composition is administered at a dosage of $1\times10^{10}$ vp.

10. The method according to claim 7, wherein step A and step B are conducted by intramuscular injection.

* * * * *